US012672611B2

(12) United States Patent
Horstmann

(10) Patent No.: US 12,672,611 B2
(45) Date of Patent: Jul. 7, 2026

(54) ROUND BALER

(71) Applicant: Maschinenfabrik Bernard Krone GmbH & Co. KG, Spelle (DE)

(72) Inventor: Josef Horstmann, Ibbenbüren (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 497 days.

(21) Appl. No.: 18/321,461

(22) Filed: May 22, 2023

(65) Prior Publication Data

US 2024/0000022 A1     Jan. 4, 2024

(30) Foreign Application Priority Data

May 23, 2022    (DE) .......................... 102022112958.6

(51) Int. Cl.
A01F 15/10          (2006.01)

(52) U.S. Cl.
CPC .................................. A01F 15/106 (2013.01)

(58) Field of Classification Search
CPC .... A01F 15/0705; A01F 5/106; A01F 15/071; A01F 15/08; A01F 2015/107
USPC ...................................... 100/88, 144; 56/341
See application file for complete search history.

(56) References Cited

U.S. PATENT DOCUMENTS 4,046,068 A * 9/1977 Eggenmuller .......... A01F 15/00
                                            100/177
4,914,900 A * 4/1990 Viaud ................. A01F 15/0705
                                            100/88

5,178,061 A * 1/1993 Alonso-Amelot .... B30B 9/3082
                                            198/642
(Continued)

FOREIGN PATENT DOCUMENTS

CA        3162753 A1    7/2021
DE        3622451 A1 *  1/1988    .......... A01F 15/106
(Continued)

OTHER PUBLICATIONS

Extended European Search Report in EP23174858.3, mailed Oct. 24, 2023, 8 pages.

*Primary Examiner* — Joseph M Rocca
*Assistant Examiner* — Sunny D Webb
(74) *Attorney, Agent, or Firm* — McKee, Voorhees & Sease, PLC

(57)          ABSTRACT

A round baler includes a feed channel leading to a pressing chamber, a transfer device with a transfer rotor driven about a transfer axis in a chamber feed direction to convey harvested material through the feed channel towards the pressing chamber, and a storage device with a storage space for temporarily receiving harvested material. So the round baler can continuously receive harvested material, the storage device comprises a storage space wall which delimits the storage space to the outside, and a drivable storage space conveyor for the revolving conveyance of harvested material within the storage space. The transfer rotor is configured to guide harvested material from the feed channel towards the storage space for intermediate storage while rotating in a storage space feed direction opposite to the chamber feed direction, and to convey harvested material delivered by the storage device through the feed channel towards the pressing chamber.

15 Claims, 7 Drawing Sheets

(56)  References Cited

U.S. PATENT DOCUMENTS

| | | | | |
|---|---|---|---|---|
| 6,886,312 B1 * | 5/2005 | Inman | .................... | A01F 25/183 |
| | | | | 53/529 |
| 7,266,936 B2 * | 9/2007 | Wingert | ............... | A01F 25/183 |
| | | | | 53/529 |
| 8,656,831 B2 * | 2/2014 | Viaud | ................. | A01F 15/0705 |
| | | | | 100/88 |
| 9,468,149 B2 * | 10/2016 | Derscheid | ............... | A01F 29/04 |
| 10,524,424 B2 * | 1/2020 | Seo | ......................... | A01F 15/07 |
| 2013/0036921 A1 | 2/2013 | Horstmann | | |
| 2014/0165856 A1 | 6/2014 | Varley | | |
| 2017/0202151 A1 | 7/2017 | Smith | | |

FOREIGN PATENT DOCUMENTS

| | | | | | | |
|---|---|---|---|---|---|---|
| EP | 2220929 | A1 | * | 8/2010 | ........... | A01F 15/106 |
| EP | 2196082 | B1 | | 2/2013 | | |
| EP | 3078255 | A1 | * | 10/2016 | ........... | A01F 15/106 |
| EP | 3203830 | B1 | | 9/2021 | | |
| FR | 2718605 | A1 | * | 10/1995 | ........... | A01F 29/005 |
| GB | 2163387 | A | * | 2/1986 | ......... | A01F 15/0715 |
| IT | 202300010374 | A1 | * | 11/2024 | ......... | A01F 15/0715 |
| KR | 20160079530 | A | * | 7/2016 | ......... | A01F 15/0705 |

\* cited by examiner

ROUND BALER

CROSS REFERENCE TO RELATED APPLICATIONS

This application claims priority under 35 U.S.C. § 119 to German Patent Application DE 10 2022 112 958.6, filed May 23, 2022, which is herein incorporated by reference in its entirety, including without limitation, the specification, claims, and abstract, as well as any figures, tables, appendices, or drawings thereof.

FIELD OF THE INVENTION

The present invention relates to improved means which enable a round baler to have a continuous intake of harvested material.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Round balers are used in agriculture to pick up harvested material, such as hay or straw, and compress it into bales. The harvested material is picked up from the ground (for example, by a pick-up baler), conveyed further, normally comminuted (for example, by means of a cutting rotor), and finally compressed into round bales of harvested material in a pressing chamber. Therefore, pressing elements act on the harvested material, which also act as conveying elements and create a revolving conveyance of the harvested material. The finished bale is wrapped with a binding material in a binding process. Twine, netting, or (for example, in the case of grass) film can be used as binding material, although the latter can also be applied outside the round baler in a bale wrapper that is separate from said baler. After binding inside the pressing chamber, the bale is ejected. Only thereinafter can the pressing chamber once again be used to form a new bale. Therefore, there is a significant period during which no harvested material can be processed. This normally means that harvested material intake must be interrupted for an equivalent period of time. This is to say; the round baler must stop for the binding and ejection process, which typically takes about one-third of the total operating time, thereby substantially reducing productivity.

Therefore, it has already been proposed in the prior art to provide an intermediate harvested material storage that is filled when no harvested material can be processed, and which storage is emptied during the next bale forming operation. The proposed solutions have, however, either not reached production maturity or have not been successful. In part, the underlying mechanisms are too complex.

Therefore, there is a strong need to have a baler that has a continuous intake of harvested material.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

For this purpose, a round baler is created, comprising a feed channel leading to a pressing chamber, a transfer device with a transfer rotor, which can be driven about a transfer axis in a chamber feed direction, in order to convey harvested material through the feed channel towards the pressing chamber in a pressing mode, as well as a storage device with a storage space for temporarily receiving harvested material, which storage space is connected to the feed channel by means of at least one storage space opening.

The round baler is configured to press agricultural harvested material into round bales, wherein the actual pressing process takes place in a pressing chamber. The agricultural harvested material may be, in particular, stalk material such as grass, straw, or hay. The term "round baler" here expressly also includes machines which, in addition to a pressing of the harvested material into bales, also perform a binding and/or a wrapping of the bales. The harvested material can be picked up by an intake device, in particular a pick-up baler, and conveyed through the feed channel towards the pressing chamber. For conveying, the round baler may comprise at least one conveying device, for example, a conveying rotor or a cutting rotor, which not only conveys the harvested material along, but also cuts it. In all cases, the harvested material stream passes through the feed channel before reaching the pressing chamber. The feed channel is configured to guide the harvested material, wherein it does not necessarily need to be configured in an entirely closed manner.

The design of the pressing chamber is not specified in the framework of the invention. It may, therefore, be a pressing chamber of a fixed or a variable size. In the first case, the round baler may comprise a plurality of pressing rollers which are rotatable about axes of rotation which are stationary with respect to a frame. In the last case, the pressing chamber is at least partially defined by an endless pressing element that can be driven in rotation, wherein it may be one or a plurality of endless compression belts or straps or, for example, a chain bar conveyor.

The round baler comprises a transfer device with a transfer rotor, wherein this designation is not to be interpreted restrictively. The transfer rotor is drivable about a transfer axis, wherein it is at least temporarily driven in pressing mode. The corresponding direction of rotation of the transfer rotor is referred to herein as the "chamber feed direction". The driving force can be generated, for example, mechanically, electrically, hydraulically, electrohydraulically, or in some other way. The transfer axis generally progresses parallel to the transverse axis or Y-axis of the round baler. In general, the transfer device, at least in pressing mode, serves to transfer harvested material to the pressing chamber by conveying it by means of the transfer rotor through the feed channel towards the pressing chamber. In this respect, the transfer device can also be regarded as a conveying device. The pressing mode can also be referred to as the bale forming mode and characterizes that working mode of the round baler in which harvested material is successively conveyed to the pressing chamber, wherein a harvested material bale is formed and compressed.

In addition, the round baler comprises a storage device with a storage space for intermediate storage of harvested material, which storage space is connected to the feed channel by means of at least one storage space opening. The storage space is therefore used to temporarily accommodate harvested material. As will be elucidated below, this is intended, in particular, for the time in which a bale of harvested material has been finished. Before the formation of the next bale can be started, the finished bale must be bound and ejected. Instead of interrupting the harvested material intake during this time, harvested material can be temporarily stored in the storage space of the storage device and once again be discharged for the formation of the next bale and be conveyed to the pressing chamber. The storage space is connected to the feed channel by means of at least one storage space opening. The connection to the feed channel does not need to be direct, which is to say, the feed channel does not need to immediately connect to the storage space beyond the storage space opening; instead, a connecting channel could also be arranged in between. In any case, an exchange of harvested material between the feed channel and the storage space is possible through the at least one storage space opening. The respective storage space opening can be configured to be closable, it is, however, preferably permanently open. Preferably, precisely one storage space opening is provided.

The storage device and the transfer device can be regarded as parts of a storage arrangement of the round baler.

According to the invention, the storage device comprises a storage space wall which delimits the storage space to the outside, as well as a drivable storage space conveyor for the revolving conveyance of harvested material within the storage space.

The storage space wall is preferably rigid and fixed in position to a frame of the round baler. Here and in the following, "frame" refers to the part of the round baler that forms its basic structure and gives it overall rigidity. The wheels of the round baler are also connected to the frame by means of a suitable mounting bracket, as is a tow bar in the case of a towed design. In addition, the frame typically comprises a housing which shields the internal parts from the outside. The storage space wall is typically made of metal, for example, sheet steel. The storage space wall delimits the storage space to the outside and thus defines its outer dimensions, although this does not mean that the storage space wall surrounds the storage space completely, in particular without gaps. The storage space wall ensures that harvested material cannot escape uncontrolled from the storage space, although partial escape may be acceptable depending on the configuration.

Furthermore, the storage device comprises a drivable storage space conveyor, which is designed for the revolving conveyance of harvested material within the storage space. The storage space conveyor can be driven mechanically, electrically, hydraulically, electrohydraulically, or in other ways. It is configured to convey the harvested material in a revolving manner, which is to say, in the manner of an endless conveyor or a circular conveyor. On the whole, the harvested material is thus conveyed through the storage space on a closed ring-like path, although the exact path of movement of individual pieces of the harvested material may possibly not be closed. Since the storage space conveyor conveys the harvested material within the storage space, it is itself at least partially arranged in the storage space.

Further, according to the invention, the transfer rotor is configured, in a storage mode, while rotating in a storage space feed direction opposite to the chamber feed direction, to guide harvested material from the feed channel for intermediate storage towards the storage space and, in the pressing mode, to convey harvested material delivered by the storage device through the feed channel towards the pressing chamber. Which is to say, the transfer rotor (or transfer device) has a threefold function. Firstly, in pressing mode, it serves to support, which is to say, in particular to maintain, the normal harvested material flow (from the intake device) through the feed channel to the pressing chamber. In addition, in storage mode, it (actively and/or passively) guides harvested material towards the storage space, which includes the possibility that it guides it all the way into the storage space. It can be said that, when compared to the pressing mode, it diverts or redirects a harvested material intake flow coming from the intake device at least partially, usually completely. In both modes, it is thereby arranged in or on the harvested material flow. The third function is to at least support the emptying of the storage space, in that the transfer rotor takes harvested material from the storage space and conveys it through the feed channel to the pressing chamber. During the pressing mode, the harvested material intake flow coming from the intake device and a harvested material storage flow coming from the storage space can at least temporarily combine to form a harvested material total flow, which is conveyed to the pressing chamber. The transfer rotor can perform its function in the pressing mode on the one hand and in the storage mode on the other hand by reversing the direction of rotation, which is to say, in the storage mode the transfer rotor rotates in the opposite direction to the chamber feed direction, which in this context is referred to as the "storage space feed direction".

The storage device is, in turn, provided to receive harvested material from the feed channel by means of at least one storage space opening in storage mode and to discharge harvested material to the feed channel by means of at least one storage space opening in pressing mode. The storage mode could also be referred to as binding mode, ejection mode, or binding-and-ejection mode, as this mode can be selected while the harvested material bale is being bound and/or ejected, such that no harvested material can be conveyed to the pressing chamber. In this storage mode, it is provided that harvested material from the feed channel enters the storage space of the storage device by means of at least one storage space opening (preferably: the storage space opening), in which storage space it can be temporarily stored. When the binding and ejection process is finished, the pressing chamber can once again be conveyed with harvested material, and the round baler can switch back to pressing mode. The previously temporarily stored harvested material can then be delivered to the feed channel by means of at least one storage space opening (preferably: the storage space opening).

The round baler according to the invention may possibly enable uninterrupted harvested material intake, so that stopping to bind and/or eject the bale is unnecessary. Most importantly, this represents a substantial time advantage, since the aforementioned operations take up a substantial portion of the total time required to provide a bale of harvested material (by way of example, about one-third, while the remaining two-thirds are required for bale formation). In some circumstances, energy consumption can also be reduced, as stopping and restarting for each binding operation is no longer necessary. The configuration of the storage device with a storage space conveyor operating in the manner of an endless conveyor offers particular advantages. The harvested material can be introduced into the storage space at one point, in the area of a storage space opening, and is then immediately transported further by the storage space conveyor, thus creating, at this point, space for subsequent harvested material. If comparatively little harvested material is being conveyed at one point of the storage space conveyor, further harvested material can be added here after one rotation of the storage space conveyor, so that the storage space can successively be filled to optimum capacity. The storage space conveyor can be realized mechanically simply and with few moving parts, as will be explained hereinafter. In addition, the outer boundary of the storage space is preferably defined by a rigid storage space wall of fixed size. This storage space wall can form an abutment for compression of the harvested material by the storage space conveyor. It can be solidly built and without moving parts. When emptying the storage space, the self-contained conveyor path of the storage space conveyor is again advantageous, since harvested material can be discharged, which is to say, removed, at a point adjacent to the storage space opening, after which the storage space conveyor immediately transports further harvested material to this point. If not all of the harvested material at one point of the storage space conveyor has been removed, this can occur at the next turn. The harvested material can also be removed or delivered successively, for example, in layers. The fact that the transfer rotor of the transfer device serves to guide and/or convey the harvested material stream in both operating modes means that the number of necessary components can be reduced, and the overall construction of the round baler can be simplified. The construction can therefore have a more compact configuration. The transfer rotor, as such, can also be implemented in a comparatively simple and mechanically solid manner.

As already explained above, the round baler is preferably configured, in pressing mode, to at least temporarily combine a harvested material intake flow coming from an intake device with a harvested material storage flow coming from the storage device to feed together a harvested material total flow and to feed this total flow to the pressing chamber. The intake device (for example, a pick-up baler) is configured for the intake of the harvested material from a field and feed it to the feed channel.

In general, the storage space conveyor can be driven in a rotating manner, which in principle allows different configurations and associated movement paths. A preferred configuration provides that the storage space conveyor can be driven in rotation about a storage space axis, wherein the storage space wall is configured at least predominantly rotationally symmetrical to the storage space axis. The storage space conveyor thus rotates about the storage space axis, which, by way of example, may run centrally through the above-mentioned inner part of the storage space conveyor. In this respect, it can also be referred to as a storage rotor. Inasmuch as the storage space conveyor is configured in a rigid manner, all parts and/or sections thereof move along circular paths about the storage space axis. This also applies, in particular, to the outermost points of the storage space tines, which can thus be guided past the storage space wall in close proximity if the storage space wall is also configured to be rotationally symmetrical to the storage space axis. In particular, the storage space wall can be cylindrical and/or cylindrical-shell-shaped, at least in sections, with the at least one storage space opening forming a cutout in the cylinder shell.

It is moreover preferred, in particular in combination with the aforementioned embodiment, that the storage space conveyor comprises an inner part of the storage space conveyor with a conveyor wall delimiting the storage space on the inward side, as well as storage space tines projecting from the inner part of the storage space conveyor towards the storage space wall. In so doing, a driving force and/or a driving torque of the storage space conveyor generally acts on the inner part of the storage space conveyor, which in turn acts as a carrier for the storage space tine and moves the storage space tine along. The conveyor wall of the inner part of the storage space conveyor is located opposite the storage space wall and, together therewith, defines the storage space available for the harvested material. The storage space tines form conveying elements that transmit the driving force of the storage space conveyor to the harvested material and drive it to move. It can also be said that the storage space tines push the harvested material ahead of them. As a rule, each storage space tine is configured in itself to be rigid, even if a certain degree of elasticity is possible. Typically, the storage space tines are made of metal, for example, steel. The term "tine" is not to be interpreted restrictively in terms of shape. A typical construction, however, provides that at least a part of the storage space tine is flat, for example, configured of sheet metal, wherein the narrow side of the tine points towards movement. A metal sheet oriented in this way can, however, also form a base section of the tine to which an attachment is connected, for example, welded. The attachment can, in turn, be formed by a sheet metal strip, the narrow side of which, however, is oriented at an angle, for example, at right angles, to the direction of movement. In this configuration, the attachment can shield the base section and protect it from wear. In addition, the attachment and base section can mechanically stabilize each other, so that a sturdier storage space tine can be realized with less material.

To keep the construction of the storage space conveyor simple and sturdy, the storage space tine is preferably rigidly connected to the inner part of the storage space conveyor. Accordingly, the movement of the inner part of the storage space conveyor—apart from a possibly given elasticity of the storage tines—is transmitted directly to the storage space tine.

Embodiments are conceivable in which the transfer axis is arranged stationary with respect to the frame of the round baler. As a rule, the mode of operation can, however, be optimized by mounting the transfer rotor rotatably on a rotor arm that is adjustable relative to a frame of the round baler. The transfer axis hereby runs through the rotor arm and changes its position when the rotor arm is adjusted. This allows the optimum position of the transfer rotor to be set depending on the operating mode or phase of the operating mode. The adjustment of the rotor arm is performed, of course, by at least one actuator, for example, electrically, hydraulically, electrohydraulically, or pneumatically.

Preferably, the transfer rotor engages in the storage space through a storage space opening as a function of the position of the rotor arm. This can mean that the transfer rotor engages or does not engage in the storage space depending on the position of the rotor arm. Alternatively or additionally, it may mean that the transfer rotor engages to different extents in the storage space depending on the position of the rotor arm. In this way, the storage rotor can reach areas of the storage space that are located close to the storage space opening or further away from it, as required. This can be advantageous both for conveying harvested material into the storage space and for conveying harvested material out.

It is possible that, in at least one position, the rotor arm at least partially closes a storage space opening, wherein it forms an extension of the storage space wall. In particular, this may be a position in which the storage rotor engages to the maximum in the storage space. Which is to say, in the corresponding position, the rotor arm and/or a section of its wall forms a continuation of the storage space wall, so to speak. In the case of a storage space wall that is rotationally symmetrical with respect to the storage space axis, the corresponding section of the wall of the rotor arm can be configured curvilinear and thus complement the storage space wall.

The engagement of the transfer tine can be adjusted, among other things, as a function of the harvested material. In this, the type of harvested material, its condition (for example, moisture content), or other properties can be consulted as parameters. As a function of this, the transfer tine can engage to a greater or lesser extent in the storage space.

To enable effective interaction with a stripper (irrespective of whether this is formed on a rotor arm or, for example, arranged stationary on the frame), it is preferred that the transfer tines have a backward pitch on a chamber feed side arranged at the front in the chamber feed direction and/or on a storage feed side arranged at the front in the storage space feed direction, so that the respective edge of the transfer tine recedes radially in a tangentially outward direction. The storage feed side corresponds in the tangential direction to the side that lies towards movement of the transfer tine during rotation in the storage space feed direction, whereas the chamber feed side lies towards movement of the transfer tine during rotation in the chamber feed direction. The terms "forward pitch" and "backward pitch" each refer to a pitch relative to the axial-radial plane. A backward pitch refers to a pitch at which the edge, as described, recedes tangentially towards the outside (which is to say, towards a radially outer end). A forward pitch would accordingly be one at which the edge projects tangentially outward. This is always relative to the direction in which the respective edge is tangentially pointing, which in this case is the storage space feed direction or the chamber feed direction. Through the backward pitch, it is possible, in cooperation with the stripper, to generate a force component acting radially outward on the harvested material, so that the harvested material is outwardly stripped off.

In so doing, the storage space tine on the conveying side may have a backward pitch and the transfer tine on the chamber feed side can have a backward pitch that is weaker than that of the storage space tine. When the storage rotor engages the storage space, both storage space tines and transfer tines act on the harvested material. The configuration described here ensures that there is an overall force component on the harvested material that is directed radially outward with respect to the storage space axis, which means that the harvested material may be conveyed radially outward out of the storage space.

In order to facilitate the inward conveying of the harvested material and to prevent the harvested material from being excessively crushed between the transfer tine and the storage space tine, it is preferred that the transfer tines on a storage feed side arranged at the front in the storage space feed direction have a backward pitch that is greater than the pitch that the storage space tines have on a rear side opposite the conveying side. The pitch on the rear side opposite the conveying side can be a lesser backward pitch, a forward pitch, or it can be zero, which is to say, the rear side of the storage space tine can run parallel to the axial-radial plane.

As already explained, in the pressing mode, the harvested material intake flow taken directly from the field and the harvested material storage flow from the storage device combine and are conveyed together to the pressing chamber. This results in a considerable harvested material total flow. On the one hand, this can be handled by increasing the conveying speed of the transfer rotor. Alternatively or additionally, a local adjustment of the cross-section through which the harvested material flow moves may be made. One embodiment provides that the round baler is configured to move a starter roller, arranged at the transition from the feed channel to the pressing chamber, in pressing mode, from an upper roller position to a lower roller position and to hold it in this position at least until the storage space is emptied. In round balers, starter rollers of this type are generally used to press the harvested material bale together with other press elements. At the beginning of bale formation, the starter rollers convey the harvested material, for example, directly against a rotating press element (for example, the press belts) and in the further course against the successively growing harvested material bale. The harvested material stream runs above the starter roller into the pressing chamber. Said upper roller position corresponds to a smaller cross-section through which the harvested material stream can pass, whereas the lower roller position corresponds to a larger cross-section which is favorable for the pressing mode, at least as long as the storage space has not been emptied.

Advantageously, the feed channel comprises a rotor bottom section below the transfer rotor, wherein the round baler is configured to adjust at least a front portion of the rotor bottom section downward with respect to the harvested material flow when the transfer rotor is moved out of the storage space and upward when the transfer rotor is moved into the storage space. By adjusting the front section (or optionally the entire rotor bottom section), the bottom profile of the feed channel can be adapted to the changing position of the transfer rotor so that the distance between the transfer rotor (for example, its transfer tine) and the front section does not change too much. Which is to say, the distance does not become too large, whereby harvested material could possibly no longer effectively be collected, and also not too small, which would restrict the effective cross-section of the feed channel or could even entail the risk of a collision between the transfer rotor and the rotor bottom section. The front section may, in particular, be connected to the transfer device by means of at least one coupling element (for example, at least one first coupling member). In this way, the adjustment of the front section is permanently coupled to the adjustment of the transfer device, normally to the adjustment of the rotor arm. In addition, the front section can be guided relative to the frame, for example, by means of a slotted guide.

The round baler is moreover advantageously configured, in pressing mode, to adjust at least one rear area of the rotor bottom section downward with respect to the harvested material flow for emptying the storage space and to adjust it upward after emptying the storage space. The rear section is generally located adjacent to or at least facing an aforementioned starter roller. The rear area can be adjusted synchronously with the adjustment of the starter roller. Insofar as the front area is adjustable as described above, the front and rear areas are preferably adjustable independently of one another. The adjustment of the rear area, like the adjustment of the starter roller, serves primarily to adapt the effective cross-section of the feed channel to the harvested material flow to be conveyed. The rear section, in particular, can be connected to the starter roller by means of at least one coupling element (for example, at least one second coupling member). The adjustment of the rear section is permanently coupled to the adjustment of the starter roller.

The storage space conveyor advantageously comprises a plurality of storage space tine rings arranged axially offset from one another with respect to the storage space axis, each storage space tine ring having a plurality of storage space tines arranged tangentially offset from one another. The storage space tines assigned to a storage space tine ring normally have identical or only slightly different axial positions relative to the storage space axis. The number of storage space tines in a storage space tine ring can be individually selected, normally, between 3 and 10 storage space tines are provided per storage space tine ring. A plurality of storage space tine rings is provided, each of which usually comprises the same number of storage space tines. The storage space tine rings are axially offset from one another. The transfer rotor advantageously comprises a plurality of tine rings arranged axially and tangentially offset from one another with respect to the transfer axis, wherein each tine ring comprises a plurality of transfer tines arranged tangentially offset from one another. The transfer tines assigned to a tine ring normally have identical or only slightly different axial positions relative to the transfer axis. The number of transfer tines in a tine ring can be individually selected, normally between 3 and 6 transfer tines are provided per tine ring. A plurality of tine rings is provided, each of which usually comprises the same number of transfer tines. The tine rings are axially offset from each other.

In addition, the storage space tine rings and/or the transfer tine rings can preferably be offset tangentially to each other, which means that the tines of different tine rings have different tangential positions with respect to the storage space axis and/or with respect to the transfer axis. This can, in particular, have the advantage that tines offset in this way normally interact with a certain amount of harvested material at different times during rotation, by way of example, by piercing the harvested material. In this way, briefly occurring force and/or torque peaks can be avoided. In particular, in the case of a large number of tine rings, it is possible that the storage space conveyor and/or the transfer rotor, despite the described tangential offset, also comprises pairs or groups of tine rings that are not offset from one another. However, these only make up a small part of the total number of tine rings.

It is preferred that the transfer rotor comprises a plurality of transfer tine rings axially spaced apart from each other with respect to the transfer axis by first intermediate spaces, and the storage space conveyor comprises a plurality of storage space tine rings axially spaced apart with respect to the storage space axis by second intermediate spaces, wherein, when the transfer rotor engages in the storage space, the storage space tine rings engage in first intermediate spaces and the transfer tine rings engage in second intermediate spaces. Which is to say, adjacent transfer tine rings are spaced apart in the axial direction with respect to the storage space axis to such an extent that a first intermediate space is respectively formed between them. This first intermediate space then extends tangentially around the storage space axis. A transfer tine ring engages in this first intermediate space, which intermediate space is arranged within the storage space. Correspondingly, adjacent transfer tine rings are spaced so far apart in the axial direction with respect to the transfer axis that a second intermediate space is formed between them. This second intermediate space then extends tangentially around the transfer axis. A storage space tine ring engages in this second intermediate space. This arrangement makes it possible, on the one hand, for the transfer tine and the storage space tine to move in opposite directions without colliding. It is moreover possible for them to move at different speeds when moving in the same direction, which can also be advantageous.

Preferably, the round baler is configured to drive the storage space conveyor continuously in a constant storage space conveyor direction both in pressing mode and in storage mode. This is to say, the storage space conveyor is not stopped, nor is there a reversal of the drive direction, in the case of a rotatory driven storage space conveyor, which is to say, the direction of rotation. Correspondingly, this simplifies the control of the storage space conveyor and also the transmission of a driving force to it. A motor, as well as, if necessary, existing means of power transmission may always operate in one direction. In addition, in the case of storage space tines, one side can be defined, which is always at the front in the direction of movement and can therefore be adapted in terms of rigidity and shape. Furthermore, the round baler is preferably configured to drive the storage space conveyor at a constant speed throughout. The actual speed of the storage space conveyor can also exhibit fluctuations in this embodiment, which fluctuations are usually limited (for example, less than 10% or less than 5%). On the part of the round baler, by way of example, on the part of a control unit thereof, it is, however, provided that the speed, for example, the rotational speed, remains the same. This further simplifies the control and the generation and/or transmission of the driving force for the storage space conveyor.

Advantageously, the round baler is configured in such a way that a conveying speed of the transfer rotor in pressing mode corresponds to at least one conveying speed of the storage space conveyor. This is to say, the round baler is configured to drive the transfer rotor and the storage space conveyor in pressing mode in such a way that the stated relation of the speeds applies. The conveying speeds are the speeds at which the conveying elements (for example, storage space tine, transfer tine) move. In general, the conveying speed is the speed at which the harvested material (at maximum) can be conveyed. If, as in the case of the transfer rotor or the storage rotor, not all parts of the conveying element move at the same speed (due to the rotational movement), the speed of a radially central part of the conveying element may be considered. In pressing mode, the transfer rotor conveys harvested material out of the storage space, wherein, for example, storage space tines and transfer tines can pass each other through the above-mentioned intermediate spaces. In this state, a fast-running transfer rotor can accelerate the outbound conveying. The relative speed at which the conveying elements of the transfer rotor meet the harvested material being conveyed by the storage space conveyor corresponds approximately to the sum of the conveying speeds, since the transfer rotor here runs counter to the storage space conveyor.

Also advantageously, the round baler is configured in such a way that a conveying speed of the transfer rotor in storage mode is lesser than a conveying speed of the storage space conveyor. In this state, the relative speed with which the conveying elements of the storage space conveyor meet the harvested material conveyed by the transfer rotor corresponds approximately to the difference in conveying speeds, since the transfer rotor runs in the same direction as the storage space conveyor. Because the storage space conveyor conveys faster than the transfer rotor, harvested material can be drawn off the transfer rotor and/or the storage space tines, if present, can strip the harvested material off the slower-running transfer tines.

The invention further provides a storage arrangement for a round baler, which storage arrangement comprises a feed channel leading to a pressing chamber, wherein the storage arrangement comprises a transfer device with a transfer rotor, which transfer rotor can be driven about a transfer axis in a chamber feed direction in order to convey, in a pressing mode, harvested material through the feed channel towards the pressing chamber, as well as a storage device with a storage space for temporarily receiving harvested material, which storage device comprises at least one storage space opening for connection to the feed channel.

According to the invention, the storage device comprises a storage space wall which delimits the storage space to the outside, as well as a drivable storage space conveyor for the revolving conveyance of harvested material within the storage space, wherein the transfer rotor is configured, in a storage mode, to guide harvested material from the feed channel towards the storage space for intermediate storage while rotating in a storage space feed direction opposite to the chamber feed direction and, in the pressing mode, to convey harvested material delivered by the storage device through the feed channel towards the pressing chamber.

The terms mentioned have already been elucidated in connection with the round baler according to the invention and will, therefore, not be explained again. Advantageous embodiments of the storage arrangement according to the invention correspond to those of the round baler according to the invention.

The terms mentioned have already been elucidated in connection with the round baler according to the invention and will, therefore, not be explained again. Advantageous embodiments of the storage device according to the invention, correspond to those of the round baler according to the invention.

It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention is now to be explained in more detail with reference to exemplary embodiments.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
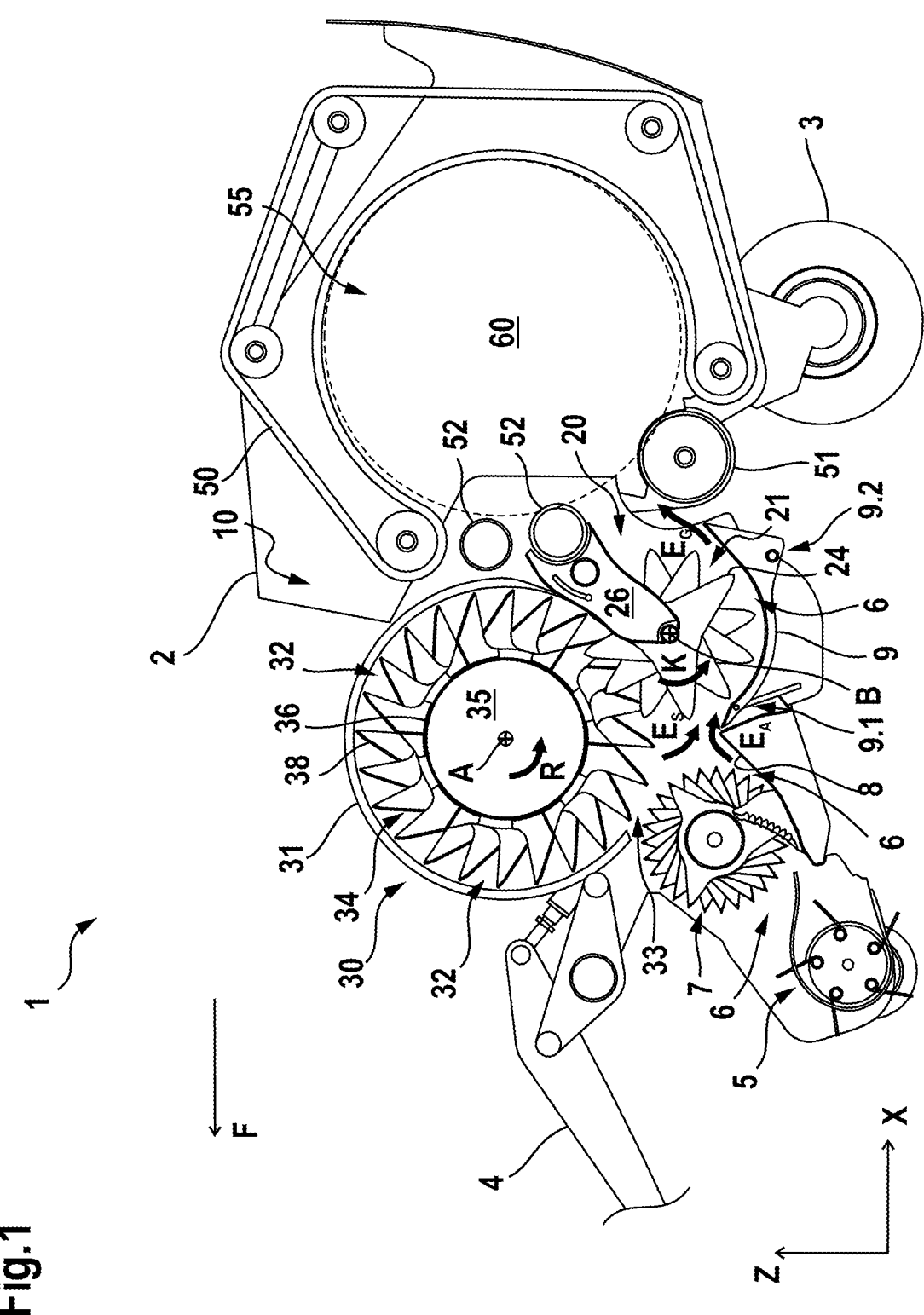
FIG. 1 shows a side view of a cross-sectional representation of a round baler according to the invention, with a first embodiment of a storage device according to the invention, in a pressing mode.

FIG. 1 shows a round baler 1 according to the present invention. A longitudinal axis X of the round baler 1 points backwards against the direction of travel F and a vertical axis Z points upwards. Wheels 3 are rotatably mounted on a frame 2 of the round baler 1, on which wheels the round baler 1 stands. In a known manner, the round baler 1 is intended to be pulled by a tractor unit, in particular an agricultural tractor (not shown), for which purpose it comprises a tow bar 4. However, the invention is not limited to towed or borne round balers 1, but rather also includes self-propelled round balers 1. A pick-up baler 5 can be seen at the front in the direction of travel F, which pick-up baler rotates clockwise during operation (with reference to FIG. 1). It is used to pick up harvested material, more precisely stalk material such as straw, hay or grass, from the ground and to convey it as a harvested material intake flow $E_A$ further into a feed channel 6, which leads to a pressing chamber 55. From the pick-up baler 5, the harvested material passes through the feed channel 6 to a cutting rotor 7, which rotates in a counterclockwise direction. It comprises a plurality of tines which grip the harvested material, cut it in cooperation with fixed knives (no reference sign), and transport it further, counter to the direction of travel F and slightly upwards through the feed channel 6. Instead of the cutting rotor 7, a conveyor rotor could also be used, which solely conveys the harvested material and does not comminute it.

Figure 3:
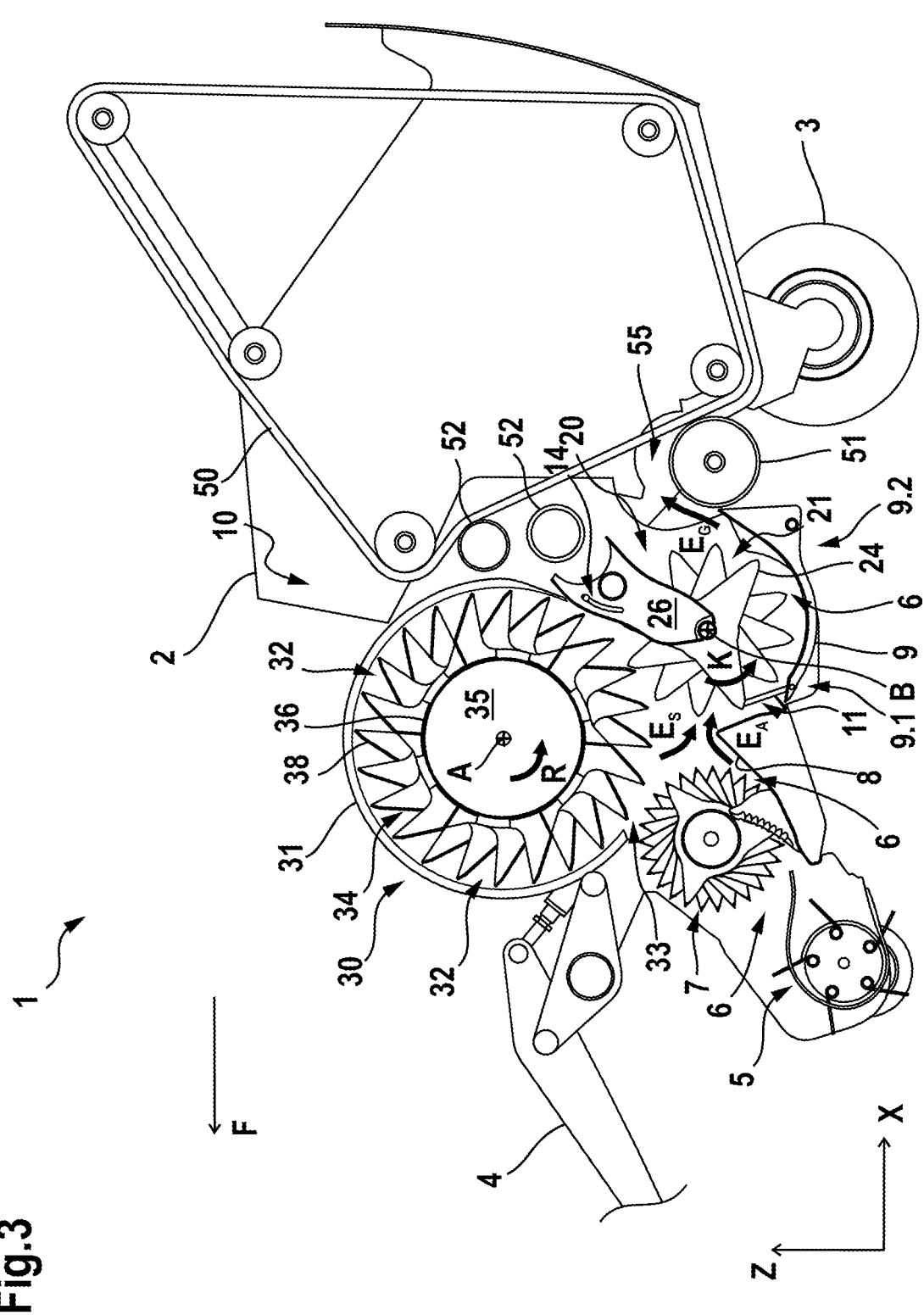
FIG. 3 shows a further side view of a cross-sectional representation of the round baler of FIG. 1, in pressing mode.
Figure 4:
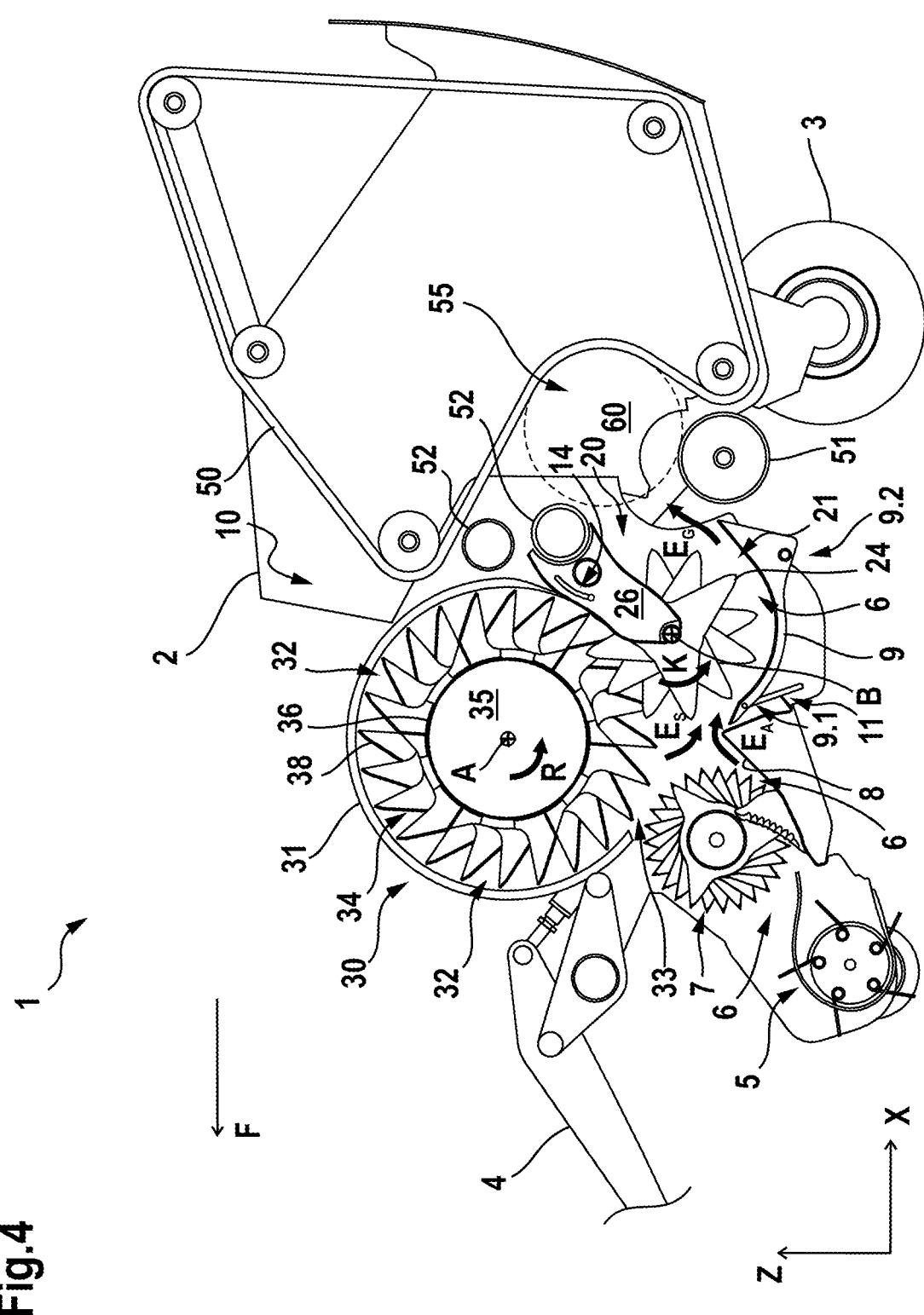
FIG. 4 shows a further side view of a cross-sectional representation of the round baler of FIG. 1, in pressing mode.
Figure 5:
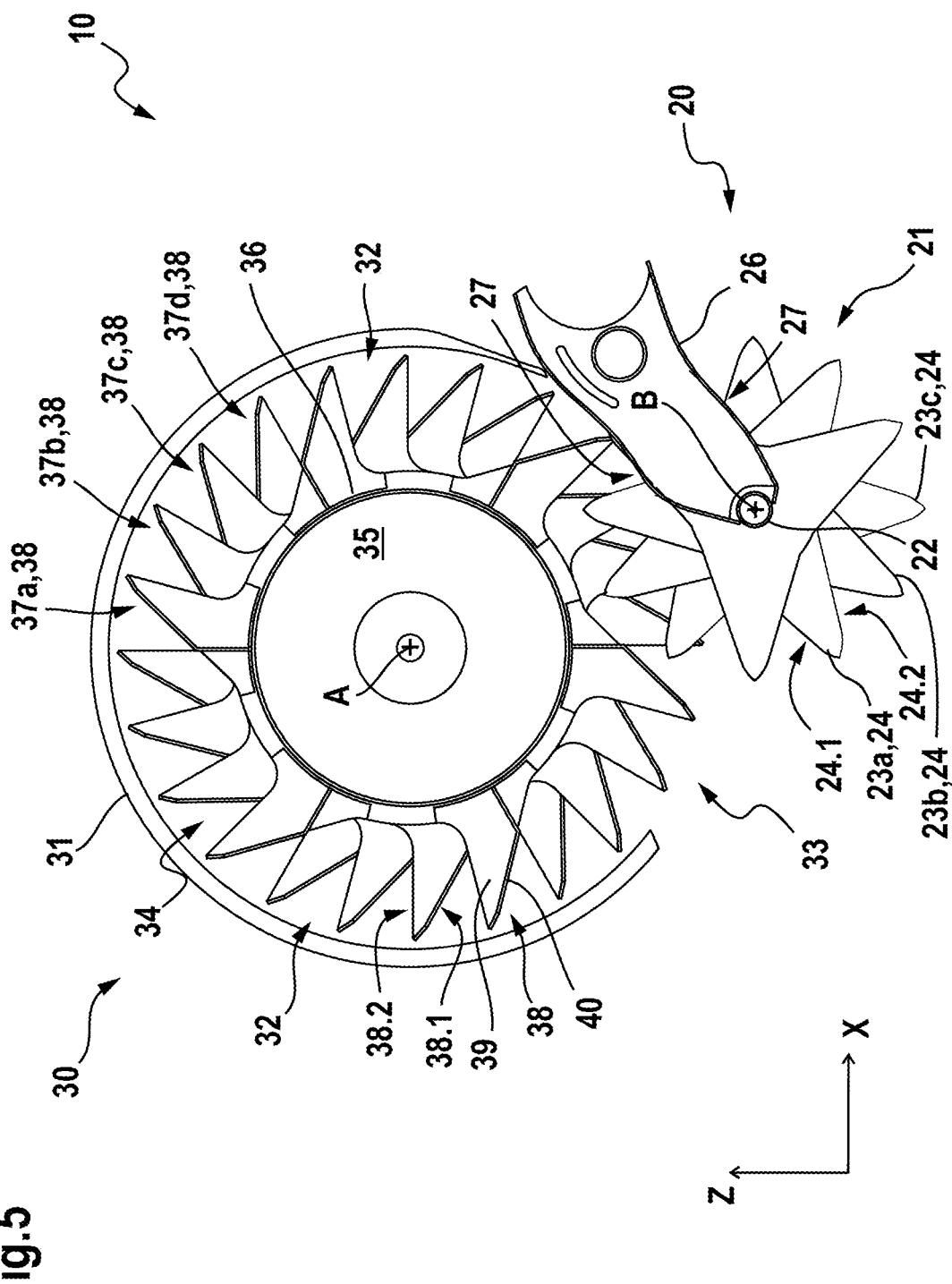
FIG. 5 shows a side view of the storage arrangement of the round baler of FIG. 1.
Figure 6:
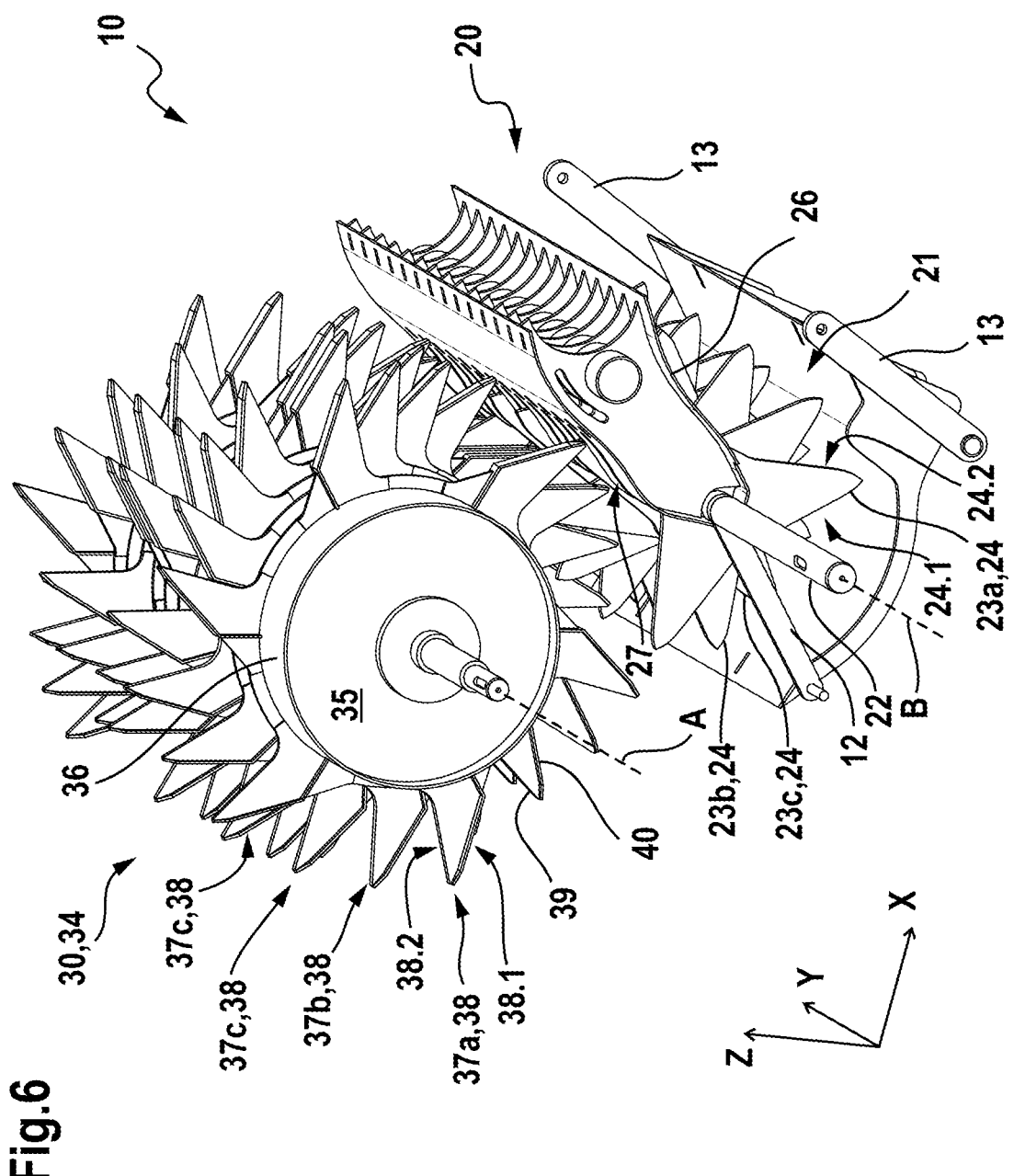
FIG. 6 shows a perspective view of the storage arrangement of FIG. 5.
Figure 7:
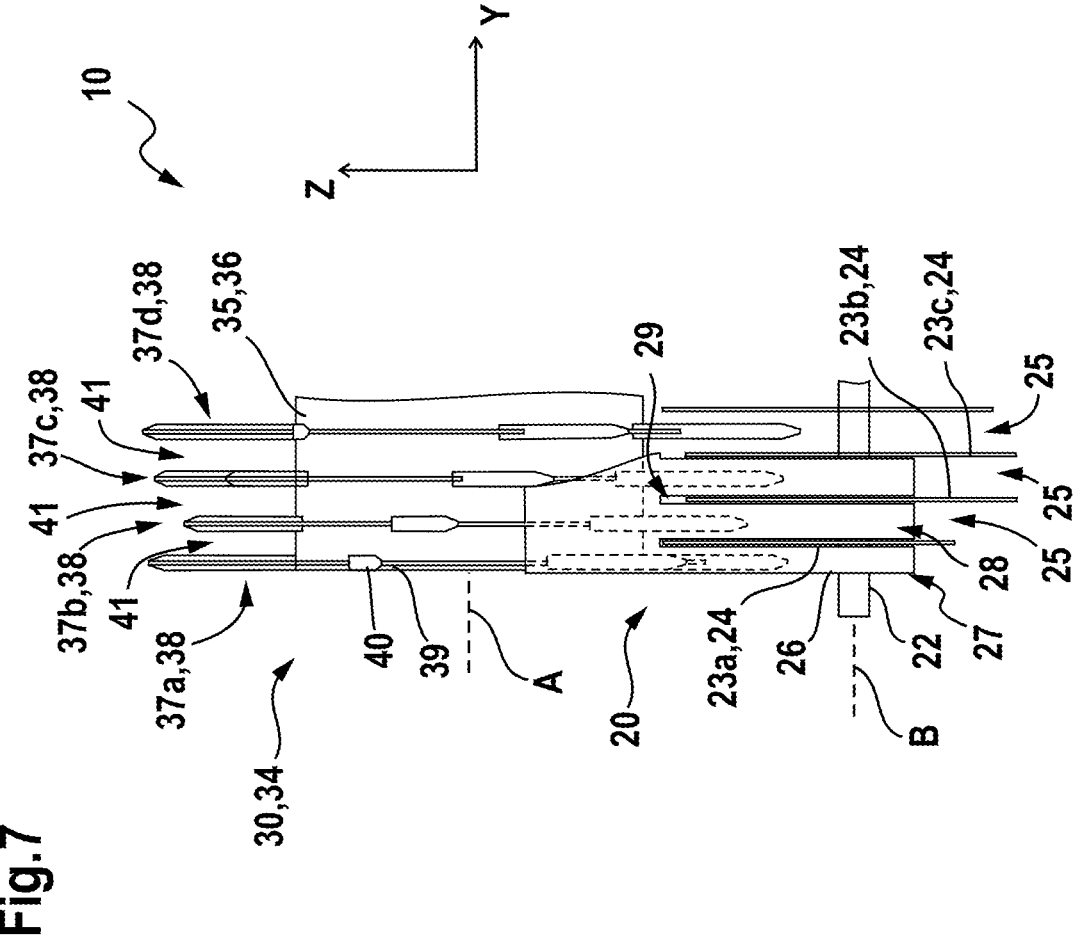
FIG. 7 shows a rear view of the storage arrangement of FIG. 5.

On the way to the pressing chamber 55, the harvested material intake flow $E_A$ passes an upwardly inclined guide bottom section 8 below a storage space opening 33. A storage device 30 connects above the storage space opening 33, which storage device comprises a storage space wall 31, which outwardly delimits a storage space 32. The storage space wall 31 is configured predominantly rotationally symmetrical to a storage space axis A. The storage space 32 communicates with the feed channel 6 by means of the storage space opening 33. A storage space conveyor 34 in the form of a storage rotor can be driven in rotation about the storage space axis A. The storage space conveyor exhibits a predominantly cylindrical inner part 35 of the storage space conveyor with a conveyor wall 36 inwardly delimiting the storage space or chamber 32. A plurality of storage space tines 38 project from the inner part 35 of the storage space conveyor towards the storage space wall 31. As can be seen in FIG. 5 through FIG. 7, the storage space tines 38 are grouped in storage space tine rings 37a-37d, which rings are axially spaced with respect to the storage space axis A and tangentially offset. In the present example, each storage space tine ring 37a-37d comprises six storage space tines 38 and axially adjacent storage space tine rings 37a-37d are each tangentially offset by 15°. Axial intermediate spaces 41 are formed between adjacent storage space tine rings 37a-37d. The individual storage space tines 38 comprise a radially tangential base section 39 and an axially extending attachment 40 connected thereto, both of which can be made of sheet steel. As indicated in FIG. 1 through FIG. 4, the storage space conveyor is driven in a storage space conveyor direction R (counterclockwise in the figures). With respect to the storage space conveyor direction R, a front conveying side 38.1 of the storage space tine 38 exhibits a backward pitch, which is to say, the edge of the respective storage space tine 38 recedes tangentially radially outward. In the example shown, the pitch relative to the radial direction is approximately 29°. On a rear side 38.2 opposite the conveying side 38.1, however, the storage space tines 38 have no pitch, which is to say, they run radially.

The harvested material stream then passes through an arc-shaped rotor bottom section 9, wherein it is conveyed by a transfer rotor 21. The transfer rotor 21 is part of a transfer device 20, which together with the storage device 30, forms a storage arrangement 10 of the round baler 1. The transfer rotor 21 is rotatably mounted on a rotor arm 26 which is adjustable relative to the frame 2, more precisely, it can be driven about a transfer axis B running parallel to the transverse axis Y. In the area of the transfer rotor 21, the rotor arm 26 is adjustably guided along a circular path which is centered on the axis of the cutting rotor 7. In an area spaced apart from the transfer rotor 21, the rotor arm 26 is guided in an arc-like manner relative to the frame 2 by means of a first slotted guide 11, and this in such a way that it is always guided closely along the edge of the storage space wall 31, which delimits the storage space opening 33. It thus forms an extension of the storage space wall 31. The adjustment of the rotor arm 26 is carried out by an actuator not shown here. The transfer rotor 21 comprises a shaft 22 to which a plurality of transfer tine rings 23a-23c are attached. Each transfer tine ring 23a-23c comprises a plurality of transfer tines 24, in this example, respectively three which are arranged tangentially offset with respect to the transfer axis B. As can be easily seen in the synopsis of FIG. 5 through FIG. 7, adjacent transfer tine rings 23a-23c are axially spaced and tangentially offset from one another, i.e., intermediate spaces 25, in this case, respectively by 30°. FIG. 1 as well as FIG. 3 through FIG. 5, show a condition in which the rotor arm 26 is positioned opposite the frame 2 in such a way that the transfer rotor 21 with the transfer tine 24 engages in the axial intermediate spaces 41 and thereby through the storage space opening 33 into the storage space 32. A front area 9.1 of the rotor bottom section 9 is guided on the frame 2 by means of a second slotted guide 14 and connected there to the shaft 22 by means of first coupling struts 12, wherein the shaft 22 can rotate freely relative to the first coupling struts 12. In this manner, the front section 9.1, guided by the second slotted guide 14, moves up and down synchronously with the shaft 22, whereby an at least approximately constant distance between the arc-shaped rotor bottom section 9 and the transfer tine 24 is ensured. Thus, the transfer tines 24 can move over the arc-shaped rotor bottom section 9 at a comparatively small distance and thus optimally grip the harvested material in the feed channel 6.

The rotor arm 26 respectively forms a stripper 27 on both sides for the transfer rotor 21. For this purpose, it comprises slots and/or recesses 29 through which the transfer tines 24 are passed. The slots and/or recesses 29 are formed between stripper sections 28, which stripper sections serve, at least predominantly, to retain the harvested material when a transfer tine 24 moves through a slot and/or recess 29. The transfer tines 24 have a greater backward pitch on a storage feed side 24.1 that lies in the front in the storage space feed direction S storage feed side 24.1 than on a chamber feed side 24.2 lying in front in chamber feed direction K. In the present example, the pitch on storage feed side 24.1 is about 20° with respect to the radial direction, whereas on the opposite chamber feed side 24.2 it is only about 17°. On both sides 24.1, 24.2, the edge must recede tangentially towards the outside, as otherwise it would not be possible to strip off harvested material at the respective stripper 27. In the example shown here, the angle between the stripper 27 and the edge of the transfer tine 24 (relative to a position in which the transfer tine is already almost completely engaged in a slot and/or recess 29) is approx. 50°, this both relative to the storage feed side 24.1 and to the chamber feed side 24.2. Advantageously, the stripper 27 could be modified in such a way that an even greater angle results, for example, over 60° or over 70°.

The greater pitch on the storage feed side 24.1 makes sense insofar as the harvested material is herewith conveyed into the storage space 32, which is why a force component acting radially outward on the harvested material is helpful with regard to the transfer axis B. The force component acting radially outward on the harvested material is also helpful. On the other hand, the chamber feed side 24.2 is intended to convey harvested material out of the storage space 32, so that a force component acting radially outward is here rather counterproductive. In particular, the interaction of the transfer tine 24 with the storage space tine 38 must, however, also be taken into account, which, in one case, is intended to ensure an inbound conveying, in the other case, an outbound conveying.

The inbound conveying is, however, also assisted by the fact that the speeds of the storage space conveyor 34 and the transfer rotor 21 in storage mode are coordinated in such a way that the tangential speed of the storage space tines 38 is greater than the tangential speed of the transfer tines 24, relative to areas of the tines 24, 38 that interact indirectly with each other. Thus, the storage space tines 38 actively pull the harvested material from the transfer tine.

In the pressing chamber 55, the actual bale formation and the pressing of the harvested material into a harvested material bale 60 take place. For this purpose, a starter roller 51, two pressing rollers 52, and a plurality of endless press elements 50 (in this case press belts) (arranged next to each other perpendicular to the drawing plane) are provided, which define the pressing chamber 55 and allow for a variable size of the same. Instead of the press belts, a chain bar conveyor could, however, also for example, be used, or it could also be a pressing chamber 55 of fixed size that is provided. The starter roller 51 is adjustable relative to the frame 2 to allow the cross-section of the access to the pressing chamber 55 to be increased if required. A rear portion 9.2 of the rotor bottom section 9 is connected to the axis of the starter roller 51 by means of second coupling struts 13 so that it follows its movement when it is adjusted.

FIG. 1 shows the round baler 1 in a pressing mode, in which mode the transfer rotor 21 conveys the harvested material through the feed channel 6 towards the pressing chamber 55. In the pressing mode, the transfer rotor 21 rotates in a chamber feed direction K, counterclockwise with respect to FIG. 1. The storage device 30 is thereby emptied completely. A harvested material intake flow $E_A$ coming from the pick-up baler 5 is conveyed to the pressing chamber 55. A condition is shown in which the harvested material bale 60 has reached its predetermined size, which is to say, a final phase of the pressing mode. The starter roller 51, which is adjustable relative to the frame 2, is arranged in an upper roller position. The front section 9.1 and the rear section 9.2 of the rotor bottom section 9 are both arranged in upper positions.

Figure 2:
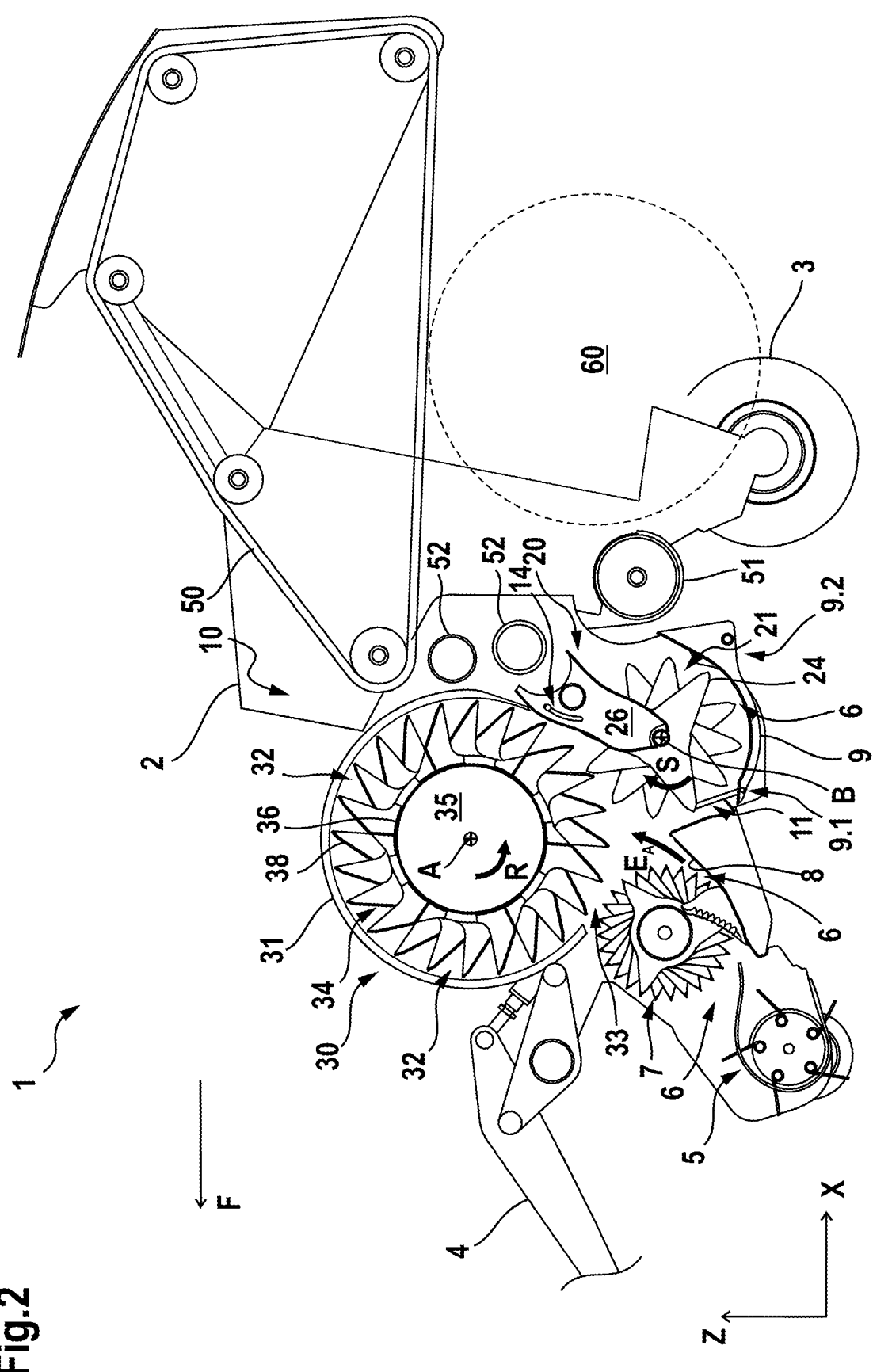
FIG. 2 shows a side view of a cross-sectional representation of the round baler of FIG. 1, in a storage mode.

Once completed, the harvested material bale 60 must be provided with binding material by means of a binding device not shown here and then ejected from the pressing chamber 55. During this period, no harvested material can be processed in the pressing chamber 55. Therefore, the round baler 1 switches to a storage mode, which is shown in FIG. 2. The essential point here is that the transfer rotor 21 changes the direction of rotation and is now driven in a storage space feed direction S, which is to say, clockwise with reference to FIG. 2. The harvested material intake flow $E_A$ coming from the pick-up baler 5 and the cutting rotor 7 is thus no longer forwarded towards the pressing chamber 55, but rather upward through the storage space opening 33 into the storage space 32. The said movement is assisted by the upward pitch of the guide bottom section 8. At the beginning of the storage mode, the transfer device 20 is in a position corresponding to FIG. 1. This allows the transfer tines 24 to engage far into the storage space 32 and thus transport the harvested material to an area close to the conveyor wall 36. In the further course, the transfer rotor 21 can successively be moved out of the storage space 32, whereas the storage space 32 is filled from the inside to the outside. Due to the connection via the first coupling struts 12, the front area 9.1 is herewith synchronously moved downwards and thus follows the movement of the transfer rotor 21, wherein it is guided by the second slotted guide 14. It is normally provided, to drive the transfer rotor 21 during the entire storage mode; under certain circumstances, however, it could also be driven only during a start phase in order to initiate the movement reversal, and thereafter continue to be rotated passively by the harvested material intake flow $E_A$. In this case, the indirect engagement with the storage space conveyor 34 in the form of a storage rotor, by means of the harvested material being conveyed, is of significant importance.

In this, the pitch of the storage space tines 38 on the rear side 38.2 is matched in such a way to the pitch of the transfer tines 24 on the storage feed side 24.1, so that the transfer tines 24 can push the harvested material alongside the storage space tines 38 into the storage space. The adjustment of the transfer device 20 is continued until the transfer tines 24 no longer or only insignificantly engage in the intermediate spaces 41, as shown in FIG. 2. The storage space 32 is sized in such a way to normally accommodate harvested material until the harvested material bale 60 has been tied and can be ejected, as shown in FIG. 2.

As the pressing chamber 55 is now ready to form a new harvested material bale 60, the round baler again changes to pressing mode, for which the transfer rotor 21 is again driven in chamber feed direction K. FIG. 3 represents the state of the round baler 1 at the beginning of the pressing mode. In this, the transfer tines 21 engage only slightly or not at all into the storage space 32. In this way, the storage rotor 21 is prevented from needing to convey out too large a quantity of harvested material in opposition to the conveying movement of the storage space conveyor 34 in the form of a storage rotor that continues in a continuous manner. Initially, only a thin, radially outermost layer with respect to the storage space axis A is collected. The harvested material from this layer is conveyed downward through the storage space opening 33 into the feed channel 6 and further along the arc-shaped rotor bottom section 9 to the pressing chamber 55. This harvested material storage flow $E_S$ coming from storage space 32 combines with the harvested material intake flow $E_A$ coming from pick-up baler 5 and cutting rotor 7 to form a harvested material total flow $E_G$. In order to empty the storage space 32 quickly and also to be able to efficiently guide the combined harvested material flows to the pressing chamber 55, the transfer rotor 21 operates at a higher speed than in storage mode, for example, 100 rpm, normally between 80 and 150 rpm. As a rule, the transfer tines 24 should thereby achieve a conveying speed of at least 3 m/s. The starter roller 51 and thus the rear section 9.2 of the rotor bottom section 9 coupled thereto are, moreover, adjusted downward in order to locally increase the effective cross section of the feed channel 6. During outbound conveying, the front sides 38.1 of the storage space tines 38 as well as the chamber feed sides 24.2 of the transfer tines 24 opposite the storage feed sides 24.1 act against each other on the harvested material in between them. The backward pitch on the front side 38.1 is greater than that on the chamber feed side 24.2, which is to say, these are coordinated so that the harvested material can be conveyed out instead of being pushed back into the storage space 32.

In the course of the pressing mode, the transfer device 20 is again successively adjusted so that the transfer rotor 21 gradually engages further into the storage space 32 and the stored harvested material is successively collected from the outside to the inside. FIG. 4 shows a condition in which the storage space tines 24 already engage far into the storage space 32, whereas a harvested material bale 60 of increasing size is already being formed in the pressing chamber 55. Here, too, the front section 9.1 of the rotor bottom section 9 is synchronously adjusted in accordance with the positive coupling, namely upwards, so that the distance to the storage rotor 21 does not increase too much.

When the storage rotor 21 engages to the maximum in the storage space 32, as shown in FIG. 1 and FIG. 4, the rotor arm 26 partially closes the storage space opening 33, wherein, as described above, an extension of the storage space wall 32 forms. More specifically, a section of its wall forms a continuation of the storage space wall 31, which is why this section is configured in a curvilinear shape.

The transfer rotor 21, in storage mode, is driven at a lower speed in storage space feed direction S, whereas, in pressing mode, it is driven at a higher speed in chamber feed direction K. The necessary direction reversal is performed, whereas the storage space tines 24 do not engage into the storage space 32. In contrast, the storage space conveyor 34 in the form of a storage rotor is driven continuously at constant speed in storage space conveyor direction R, which greatly simplifies its control, as well as the overall control of the round baler 1.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 1 | Round baler |
| 2 | Frame |
| 3 | Wheels |
| 4 | Tow bar |
| 5 | Pick-up baler |
| 6 | Feed channel |
| 7 | Cutting rotor |
| 8 | Guide bottom section |
| 9 | Arc-shaped rotor bottom section |
| 9.1 | Front area of rotor bottom section |
| 9.2 | Rear portion of rotor bottom section |
| 10 | Storage arrangement |
| 11 | First slotted guide |
| 12 | First coupling struts |
| 13 | Second coupling struts |
| 14 | Second slotted guide |
| 20 | Transfer device |
| 21 | Transfer rotor |
| 22 | Shaft |
| 23a-c | Transfer tine rings |
| 24 | Transfer tines |
| 24.1 | Storage feed side of transfer tines |
| 24.2 | Chamber feed side of tranfer tines |
| 25 | First intermediate spaces, i.e., axially spacing, and tangential offsetting of tines |
| 26 | Rotor arm |
| 27 | Stripper |
| 28 | Stripper sections |
| 29 | Slots and/or recesses |
| 30 | Storage device |
| 31 | Storage space wall |
| 32 | Storage space |
| 33 | Storage space opening |
| 34 | Storage space conveyor |
| 35 | Cylindrical inner part |
| 36 | Conveyor wall |
| 37a-d | Storage space tine rings |
| 38 | Storage space tines |
| 38.1 | Front conveying side of storage space tine |
| 38.2 | Back conveying side of storage space tine |
| 39 | Radially tangential base section |
| 40 | Axially extending attachment |
| 41 | Second intermediate spaces, axial |
| 50 | Endless press elements |
| 51 | Starter roller |
| 52 | Two pressing rollers |
| 55 | Pressing chamber |
| 60 | Harvested material bale |
| A | Storage space axis |
| B | Transfer axis B |
| $E_A$ | Harvested material intake flow |
| $E_G$ | Harvested material total flow |
| $E_S$ | Harvested material storage flow |
| F | Direction of travel |
| K | Feed direction |
| R | Chamber feed direction |
| S | Storage space feed direction |
| X | Longitudinal axis |
| Y | Transfer axis Y |
| Z | Vertical axis |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A round baler (1) comprising of:

a feed channel (6) leading to a pressing chamber (55), a transfer device (20) with a transfer rotor (21), which can be driven about a transfer axis (B) in a chamber feed direction (K), in order to convey harvested material through the feed channel (6) towards the pressing chamber (55) in a pressing mode; and a storage device (30) with a storage space (32) for temporarily receiving harvested material, which storage space is connected to the feed channel (6) by means of at least one storage space opening (33), wherein the storage device (30) comprises a storage space wall (31) which delimits the storage space (32) to the outside, as well as a drivable storage space conveyor (34) for the revolving conveyance of harvested material within the storage space (32), wherein the transfer rotor (21) is configured, in a storage mode, to guide harvested material from the feed channel (6) towards the storage space (32) for intermediate storage while rotating in a storage space feed direction(S) opposite to the chamber feed direction (K), and, in the pressing mode, to convey harvested material delivered by the storage device (30) through the feed channel (6) towards the pressing chamber (55);

wherein the transfer rotor (21) is rotatably mounted on a rotor arm (26) which is adjustable relative to a frame (2) of the round baler (1).

2. The round baler (1) according to claim 1, wherein the round baler is configured, in the pressing mode, to at least temporarily combine a harvested material intake flow ($E_A$) coming from an intake device (5) with a harvested material storage flow ($E_S$) coming from the storage device (30) to feed together a harvested material total flow ($E_G$) and to feed this total flow to the pressing chamber (55).

3. The round baler (1) according to claim 1, wherein the storage space conveyor (34) can be driven in rotation about a storage space axis (A) and comprises an inner part (35) of the storage space conveyor with a conveyor wall (36) delimiting the storage space inwards as well as storage space tines (38) projecting from the conveyor wall towards the storage space wall (31), wherein the storage space wall (31) is configured at least predominantly rotationally symmetrical to the storage space axis (A).

4. The round baler (1) according to claim 1, wherein the transfer rotor (21) comprises a plurality of transfer tines (24) extending radially outwards with respect to the transfer axis (B).

5. The round baler (1) according to claim 1, wherein the transfer rotor (21) engages in the storage space (32) through the at least one storage space opening (33) depending on the position of the rotor arm (26).

6. The round baler (1) according to claim 1, wherein the storage space tines (38) on a conveying side (38.1) comprise a backward pitch so that the edge of the storage space tines (38) recedes tangentially radially outwards, and the transfer tines (38) on a chamber feed side (24.2) arranged at the front in the chamber feed direction (K) comprise a backward pitch which is less than that of the storage space tines (38).

7. The round baler (1) according to claim 1, wherein the transfer tines (24) on a storage feed side (24.1) arranged at the front in the storage space feed direction(S) have a backward pitch which is greater than a pitch which the storage space tines (38) have on a rear side (38.2) opposite a conveying side (38.1).

8. The round baler (1) according to claim 1, further comprising a starter roller (51) arranged at the transition from the feed channel (6) to the pressing chamber (55), movable from an upper roller position to a lower roller position and to hold the starter roller (51), in pressing mode, in this position at least until the storage space (32) is emptied.

9. The round baler (1) according to claim 1, wherein the feed channel (6) includes a rotor bottom section (9) below the transfer rotor (21), wherein the round baler (1) is configured to adjust, at least a front portion (9.1) of the rotor bottom section (9) downwards with respect to the harvested material flow when the transfer rotor (21) is moved out of the storage space (32) and upwards when the transfer rotor (21) is moved into the storage space (32).

10. The round baler (1) according to claim 9, wherein round baler (1) is configured, in the pressing mode, to adjust at least one rear area (9.2) of the rotor bottom section (9) downward with respect to the material flow for emptying the storage space (32) and to adjust it upward after emptying the storage space (32).

11. The round baler (1) according to claim 1, wherein the transfer rotor (21) includes a plurality of transfer tine rings (23a-23c) axially spaced apart from each other with respect to the transfer axis (B) by first intermediate spaces (25) and the storage space conveyor (34) comprises a plurality of storage space tine rings (37a-37d) axially spaced apart with respect to the storage space axis (A) by second intermediate spaces (41), wherein, when the transfer rotor (21) engages the storage space (32), the storage space tine rings (37a-37d) engage in the first intermediate spaces (25) and the transfer tine rings (23a-23c) engage in the second intermediate spaces (41).

12. The round baler (1) according to claim 1, further comprising a conveying speed of the transfer rotor (21) in pressing mode corresponds to at least one conveying speed of the storage space conveyor (34).

13. The round baler (1) according to claim 1, further comprising a conveying speed of the transfer rotor (21) in storage mode is lower than a conveying speed of the storage space conveyor (34).

14. A storage arrangement (10) for a round baler (1), comprising:

a feed channel (6) leading to a pressing chamber (55), wherein the storage arrangement (10) comprises a transfer device (20) with a transfer rotor (21) which can be driven about a transfer axis (B) in a chamber feed direction (K), in order to convey, in a pressing mode, harvested material through the feed channel (6) towards the pressing chamber (55); and a storage device (30) with a storage space (32) for temporarily receiving harvested material, which storage space comprises at least one storage space opening (33) for connection to the feed channel (6), wherein the storage device (30) comprises a storage space wall (31) which delimits the storage space (32) to the outside, as well as a drivable storage space conveyor (34) for the revolving conveyance of harvested material within the storage space (32), wherein the transfer rotor (21) is configured, in a storage mode, to guide harvested material from the feed channel (6) towards the storage space (32) for intermediate storage while rotating in a storage space feed direction(S) opposite to the chamber feed direction (K), and, in the pressing mode, to convey harvested material delivered by the storage device (30) through the feed channel (6) towards the pressing chamber (55);

wherein the transfer rotor (21) is rotatably mounted on a rotor arm (26) which is adjustable relative to a frame (2) of the round baler (1).

15. A round baler (1) comprising of:

a feed channel (6) leading to a pressing chamber (55), a transfer device (20) with a transfer rotor (21), which can be driven about a transfer axis (B) in a chamber feed direction (K), in order to convey harvested material through the feed channel (6) towards the pressing chamber (55) in a pressing mode; and a storage device (30) with a storage space (32) for temporarily receiving harvested material, which storage space is connected to the feed channel (6) by means of at least one storage space opening (33), wherein the storage device (30) comprises a storage space wall (31) which delimits the storage space (32) to the outside, as well as a drivable storage space conveyor (34) for the revolving conveyance of harvested material within the storage space (32), wherein the transfer rotor (21) is configured, in a storage mode, to guide harvested material from the feed channel (6) towards the storage space (32) for intermediate storage while rotating in a storage space feed direction(S) opposite to the chamber feed direction (K), and, in the pressing mode, to convey harvested material delivered by the storage device (30) through the feed channel (6) towards the pressing chamber (55);

wherein the transfer rotor (21) includes a plurality of transfer tine rings (23*a*-23*c*) axially spaced apart from each other with respect to the transfer axis (B) by first intermediate spaces (25) and the storage space conveyor (34) comprises a plurality of storage space tine rings (37*a*-37*d*) axially spaced apart with respect to the storage space axis (A) by second intermediate spaces (41), wherein, when the transfer rotor (21) engages the storage space (32), the storage space tine rings (37*a*-37*d*) engage in the first intermediate spaces (25) and the transfer tine rings (23*a*-23*c*) engage in the second intermediate spaces (41).

\* \* \* \* \*